(12) United States Patent
Johnson et al.

(10) Patent No.: US 9,090,294 B2
(45) Date of Patent: Jul. 28, 2015

(54) AERODYNAMIC FAIRINGS FOR TRAILERS

(71) Applicant: Heil Trailer International, Co., Cleveland, TN (US)

(72) Inventors: James Michael Johnson, Athens, TN (US); Robert Joseph Winder, Athens, TN (US); Sean Graham, Seattle, WA (US)

(73) Assignee: HEIL TRAILER INTERNATIONAL, CO., Cleveland, TN (US)

( * ) Notice: Subject to any disclaimer, the term of this patent is extended or adjusted under 35 U.S.C. 154(b) by 0 days.

(21) Appl. No.: 14/218,136

(22) Filed: Mar. 18, 2014

(65) Prior Publication Data

US 2014/0284963 A1 Sep. 25, 2014

Related U.S. Application Data

(63) Continuation of application No. 13/682,904, filed on Nov. 21, 2012, now Pat. No. 8,684,448.

(60) Provisional application No. 61/628,083, filed on Nov. 22, 2011.

(51) Int. Cl.
*B62D 35/00* (2006.01)
*B62D 35/02* (2006.01)

(52) U.S. Cl.
CPC ............... *B62D 35/02* (2013.01); *B62D 35/00* (2013.01); *B62D 35/001* (2013.01)

(58) Field of Classification Search
CPC ....... B62D 35/02; B62D 35/00; B62D 35/001
USPC .............................. 296/180.1–180.5
See application file for complete search history.

(56) References Cited

U.S. PATENT DOCUMENTS

| | | | | |
|---|---|---|---|---|
| 3,311,269 A | * | 3/1967 | Mendez | 222/626 |
| 3,945,677 A | * | 3/1976 | Servais et al. | 296/180.2 |
| 4,103,957 A | * | 8/1978 | Landry et al. | 296/180.4 |
| 4,140,349 A | * | 2/1979 | Behnken | 406/39 |
| 4,170,378 A | * | 10/1979 | Jacobsen | 296/180.4 |
| 5,073,259 A | * | 12/1991 | Solimar | 210/232 |
| 5,819,970 A | * | 10/1998 | Solimar | 220/1.5 |
| 6,877,793 B2 | * | 4/2005 | Cory | 296/180.1 |
| 7,008,005 B1 | * | 3/2006 | Graham | 296/180.4 |
| 8,025,330 B2 | * | 9/2011 | Reiman et al. | 296/180.4 |
| 8,083,284 B1 | * | 12/2011 | Logounov | 296/180.2 |
| 8,123,281 B2 | * | 2/2012 | Perkins et al. | 296/180.2 |
| 8,167,358 B2 | * | 5/2012 | Burrows | 296/180.1 |
| 2007/0132276 A1 | * | 6/2007 | Wood | 296/180.1 |
| 2008/0217957 A1 | * | 9/2008 | Schoon et al. | 296/180.4 |
| 2011/0062749 A1 | * | 3/2011 | Graham et al. | 296/180.4 |
| 2011/0109121 A1 | * | 5/2011 | Salari et al. | 296/180.2 |
| 2012/0001451 A1 | * | 1/2012 | Breidenbach | 296/180.1 |
| 2012/0086194 A1 | * | 4/2012 | Carrier | 280/837 |
| 2012/0126573 A1 | * | 5/2012 | Minbiole | 296/180.2 |
| 2012/0139290 A1 | * | 6/2012 | Kenevan | 296/180.3 |
| 2013/0127203 A1 | * | 5/2013 | Johnson et al. | 296/180.4 |

* cited by examiner

*Primary Examiner* — Lori L Lyjak
(74) *Attorney, Agent, or Firm* — McGuireWoods, LLP

(57) ABSTRACT

A system and method aerodynamic fairings including a gap fairing. The gap fairing includes multiple panels. The multiple panels are interconnected utilizing connectors to form a half conical shape extending from a front portion of a trailer. The gap fairing also includes supports connected to the multiple panels through support structure of the trailer.

17 Claims, 15 Drawing Sheets

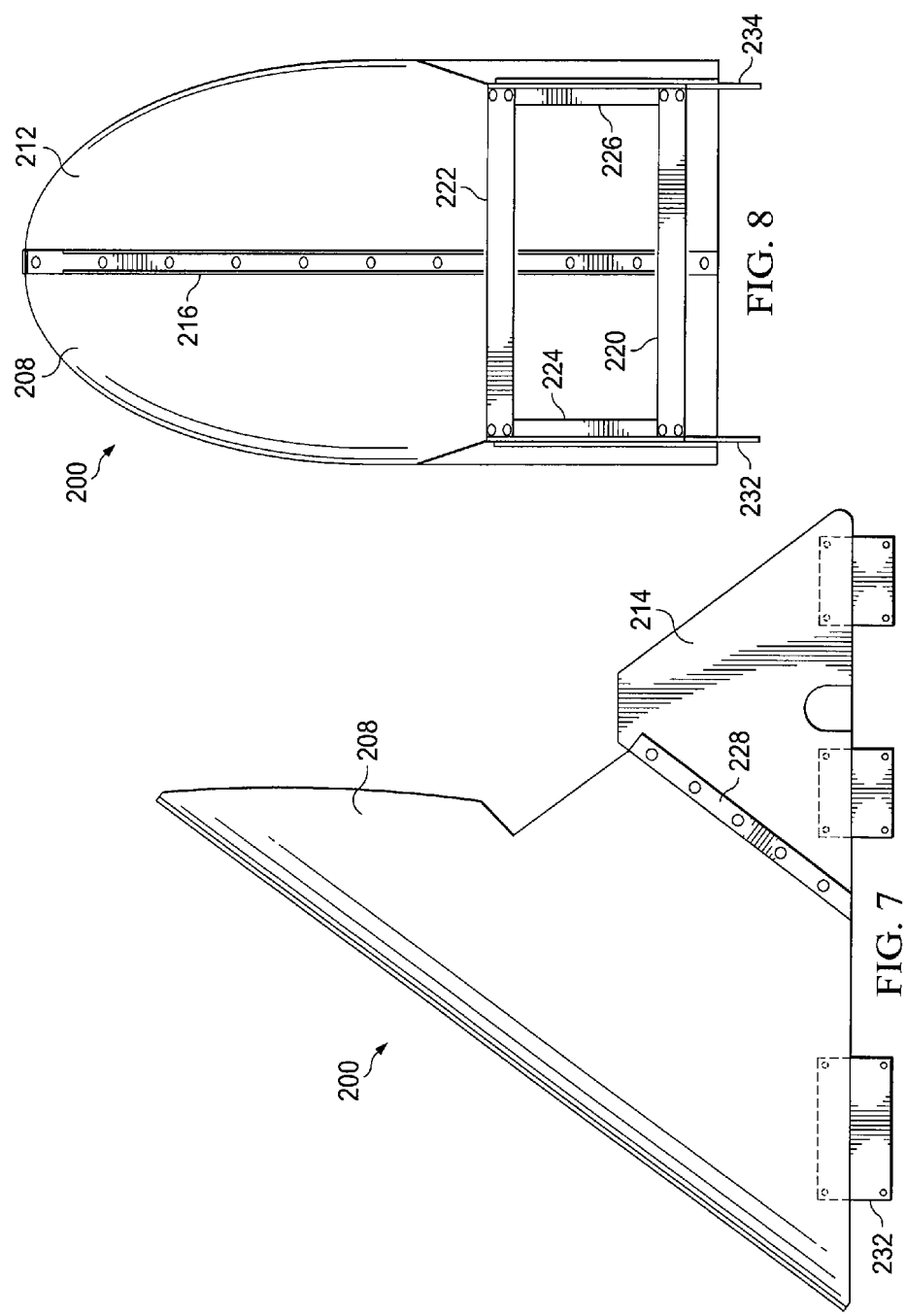

AERODYNAMIC FAIRINGS FOR TRAILERS

CROSS REFERENCE TO RELATED APPLICATIONS

This application is a continuation of U.S. patent application Ser. No. 13/682,904, filed Nov. 21, 2012 entitled AERODYNAMIC FAIRINGS FOR TRAILER, which claims priority to U.S. Provisional Patent Application Ser. No. 61/628,083, filed Nov. 22, 2011 entitled AERODYNAMIC FAIRINGS FOR TRAILER, the entire teachings of which are incorporated herein by reference.

FIELD OF THE INVENTION

The present invention relates generally to trailers, and includes the type of trailer that is utilized to transport particulate materials.

BACKGROUND

Many particulate materials are conveniently transported by truck, although they may also be transported by railcar, barge or by other means. Trucks that are used to transport such materials commonly include a tractor and an attached trailer having a tank or other container mounted thereon. Such trailers may also be loaded on railcars or barges, or a container may be mounted directly on a railcar or barge.

Frequently, these transport containers are referred to as pneumatic containers because of the pneumatic method, involving gas or air-entrainment, by which they may be loaded and unloaded. Particulate materials that are generally transported in pneumatic containers include agricultural products such as grain, corn kernels, beans, flour, sugar, peanuts and the like, light-weight aggregate products, and intermediate products for various industrial uses such as plastic pellets, powders, coke, lime, silica gel, powdered acid resins, rare earth powders, powdered alumina, and so forth.

Pneumatic containers generally include one or more product compartments that are usually cylindrical and/or spherical in shape in order to facilitate unloading by a method which involves pressurizing the compartments. Cylindrical or spherical product compartments are also generally easy to completely empty. For example, each product compartment may be provided with a discharge hopper that may be generally cylindrical or conical in shape. Each discharge hopper may have a material outlet at the bottom and a valve which controls the entry of material into the outlet.

An unloading system may also be provided which includes a blower or other mechanism for pressurizing air or another gas. The blower may provide the energy required for unloading the material from the container in the form of compressed air or another gas. For example, one end of a pressurizing gas conduit may be attached to the blower and the other end to a pressurizing gas inlet in the container. Operation of the blower compresses air or gas to move it through the pressurizing gas inlet into the container, thereby increasing the pressure of the air or gas above the material in the product compartments in the container in order to assist in discharging material through the hopper outlets. One end of a material conveying conduit may also attach to the blower and extend past and connect to each material outlet so that when the product compartment has been pressurized, air or another gas may be directed into the material conveying conduit to entrain material passing through each material outlet and carry it to the discharge end of the conduit. The container may be mounted on a frame which includes the undercarriage of a trailer. The product compartments of the container are generally enclosed by a sheet metal sheath, although the front of the sheath enclosure usually has a flat or nearly flat face.

It is known to streamline the undercarriage of a box-type trailer. However, the aerodynamic characteristics of a box-type trailer are quite different from those of a pneumatic container trailer.

SUMMARY

One embodiment includes a system and method for aerodynamic fairings including a gap fairing. The gap fairing may include a multiple panels. The multiple panels may interconnected utilizing connectors to form an aerodynamic shape extending from a front portion of a trailer. The gap fairing also includes supports connected to the plurality of panels through support structure of the trailer.

Another embodiment provides a pneumatic container trailer with a gap fairing. The pneumatic container trailer may include a support structure. The pneumatic container trailer may also include multiple panels interconnected to form a substantially half conical shape. The multiple panels are interconnected utilizing connectors. The pneumatic container trailer may also include supports connected between multiple panels through the support structure of the trailer.

Yet another embodiment provides a gap fairing. The gap fairing may include multiple panels. The multiple panels are interconnected utilizing connectors to extend over a support structure of a pneumatic container trailer. The gap fairing may also include supports connected to the multiple panels that extend through the support structure of the trailer to secure the multiple panels.

BRIEF DESCRIPTION OF THE DRAWINGS

Illustrative embodiments of the present invention are described in detail below with reference to the attached drawing figures, which are incorporated by reference herein and wherein:

FIG. 7 is a schematic, side view of the gap fairing in accordance with an illustrative embodiment;

FIG. 8 is a schematic, rear view of the gap fairing in accordance with an illustrative embodiment;

DETAILED DESCRIPTION OF THE DRAWINGS

Figure 1:
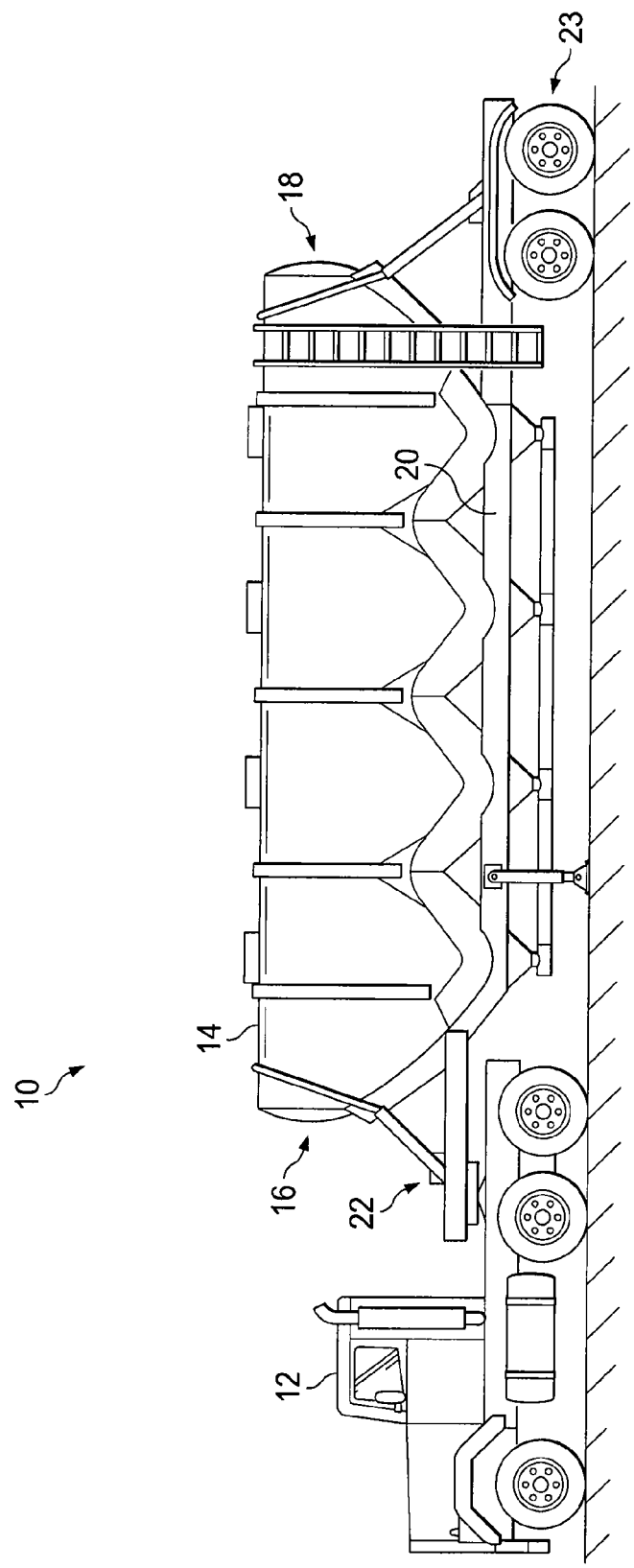
FIG. 1 is a side view of a tractor and a pneumatic trailer in accordance with an illustrative embodiment.

The illustrative embodiments provide a system, method, fairings, and components for improving the aerodynamic characteristics of a pneumatic container trailer, and thereby reducing dragging and improving the fuel efficiency of the trailer. Field testing shows that the described embodiments may result in fuel economy improvements as much as seven tenths of a mile per gallon. Other advantages and features of the illustrative embodiments are apparent from an examination of the drawings and the ensuing description.

The illustrative embodiments provide a first and second fairing ("fairings" or "pair of fairings") for improving the aerodynamic characteristics of trailers, such as a pneumatic container trailer. A gap fairing is provided for the front end of the pneumatic container trailer and an undercarriage fairing is provided for the wheel assembly. The gap fairing may be utilized to improve the aerodynamics of wind striking and being diverted around the front portion of the pneumatic container trailer. The undercarriage fairing may be placed proximate the wheel assembly with components on both sides of the pneumatic container trailer (just in front of the rear wheels) thereby reducing the drag of the wheel assembly and other portions of the pneumatic container trailer.

The fairings may be positioned, adjusted, and customized to fit trailers of different types (e.g. Super Jet dry bulk and Super Jet trailers) and produced by different manufacturers (e.g. Heil, J&L Trailers, etc.). For example, during installation the fairings may be bent, trimmed, cut, adjusted, or otherwise modified to fit the selected trailer. A person installing the trailers may need to accommodate gauges, hoses, storage components, hoppers, suspension, or different frame sizes.

The gap fairings and the undercarriage fairings may be configured to be shipped in flat packages to reduce the shipping price and cost. For example, the fairings may be shipped as kits that may be installed on new or existing trailers to reduce drag and improve fuel efficiency for the vehicle (e.g. semi-truck, truck, etc.) pulling the trailer. For example, the components of the fairings may be shipped on a 4×8 foot pallet reducing shipping prices. The fairings may be shipped as modular kits including plastic panels, metal connectors, connection components (e.g. bolts, washers, nuts, fasteners, etc.), and support components (e.g. U-channels, metal brackets, flexible rods, etc.).

In one embodiment, the components of the fairings may be bolted together and attached or clamped to existing trailer components. The bolts and other fasteners (e.g. carriage bolt, jam nut fasteners, etc.) may pre-configured to specific thicknesses to secure the components of the fairings without inhibiting the thermal expansion of the plastic components. The fairings may be installed by one or more individuals utilizing hand tools. In one embodiment, the fairings may be fabricated, shipped, and installed in kits that reduce the number of holes or modifications that are required to the trailer itself.

The fairings may also be easily removed for trailer maintenance or repairs. In one embodiment, the components of the fairings may include rigid high-density plastic and aluminum to provide strength while keeping weight low. The fairings are configured to resist road salts and corrosion, do not fade or discolor, and are easily cleaned with typical trailer wash agents. The fuel savings implemented by installing the fairings generate a significant return on investment with typical payback being realized in less than one year. The size and shape of the fairings may vary between different trailer types and manufacturers. For example, the panel sizes and connectors may vary to accommodate the different frame, beam, and rail sizes and configurations, trailer components, and so forth.

In one embodiment, the panels may have different cut-outs or knock-out based on the make, model, operator, and configuration of the trailer. The fairings may have a surface (e.g. low affinity for material adherence) that prevents materials, such as mud, salt, or dust from adhering to the different components. The fairings may be sold and shipped together or separately based on the needs of the individual operator. Although the fairings are described as having multiple panels (i.e. front and rear panels for both a left side of the trailer and a right side of the trailer) for an installation kit. In one embodiment, the fairings may include only a left side and right side panel that may be attached or connected to form the gap fairing or the undercarriage fairing.

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless explicitly so stated. The different embodiments, features, and description for the fairings may be utilized in any number of combinations and are not limited to a particular embodiment.

Several terms are specifically defined herein. These terms are to be given their broadest possible construction consistent with such definitions, as follows:

The term "particulate material" refers to granular, fluent or comminuted material that is capable of being transported through a conduit by an entraining gas. The terms "front", "forward" and similar terms refer to the end of a trailer, or a component or portion of a trailer, which is nearest the tractor when the trailer is in use on a highway. The terms "back", "rearward" and similar terms refers to the end of a trailer, or a component or portion of a trailer, which is farthest away from the tractor when the trailer is in use on a highway. The illustrative embodiments may be applied to trailers, vehicles, trains, or other moving apparatuses.

FIG. 1 is a side view of a tractor 12 and a pneumatic container trailer 10 in accordance with an illustrative embodiment. FIG. 1 illustrates a pneumatic container trailer 10 which is attached to tractor 12. The tractor 12 represents any number of semi-trucks, tractors, cars, trains or other vehicles that may pull the pneumatic container trailer 10. The pneumatic container trailer 10 includes pneumatic container 14 including four product compartments that are enclosed by an exterior sheath. The pneumatic container trailer 10 is representative of any number of containers as utilized in numerous applications or as are described and shown herein. The pneumatic container 14 has a front end 16 and a rear end 18, and is mounted on frame 20 which includes front frame portion 22 and undercarriage wheel assembly 23.

Figure 2:
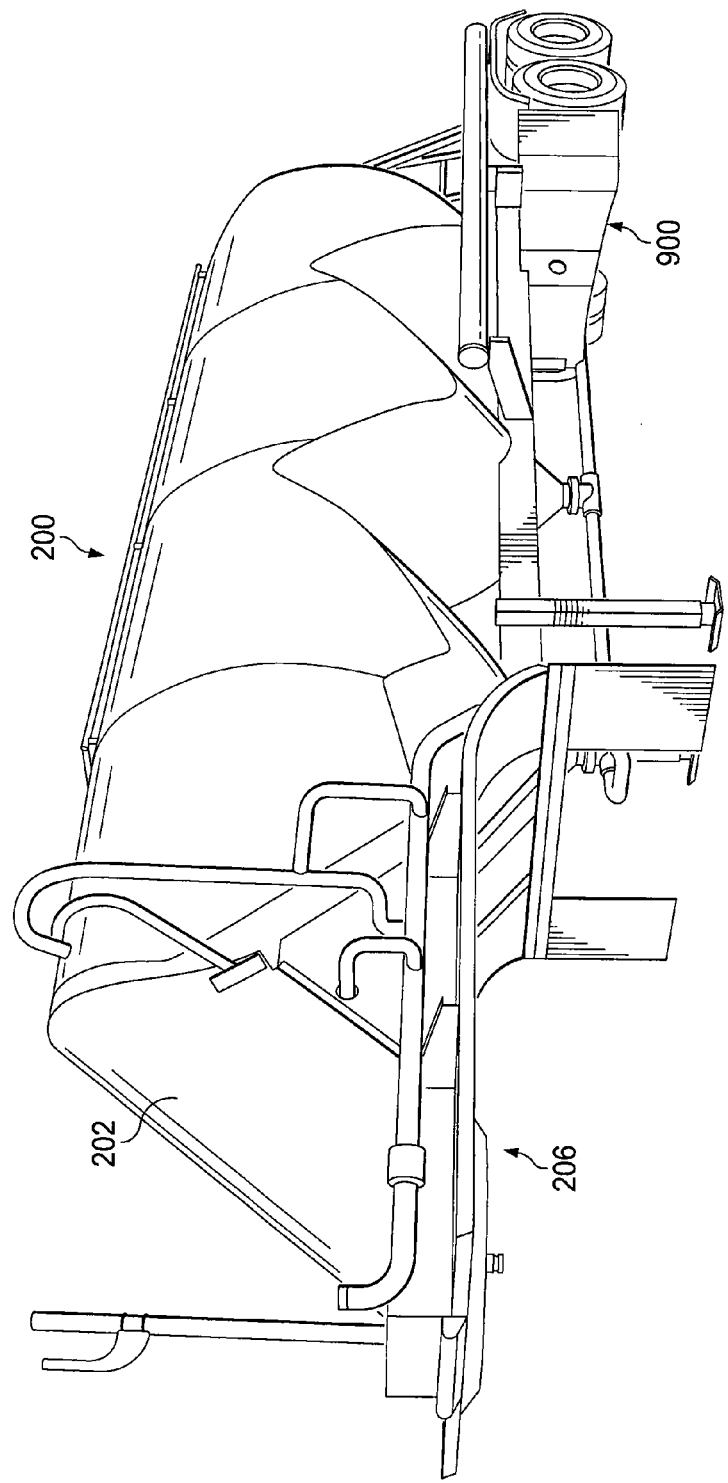
FIG. 2 is a schematic, pictorial representation of a pneumatic container trailer with a gap fairing and an undercarriage fairing installed in accordance with an illustrative embodiment.
Figure 3:
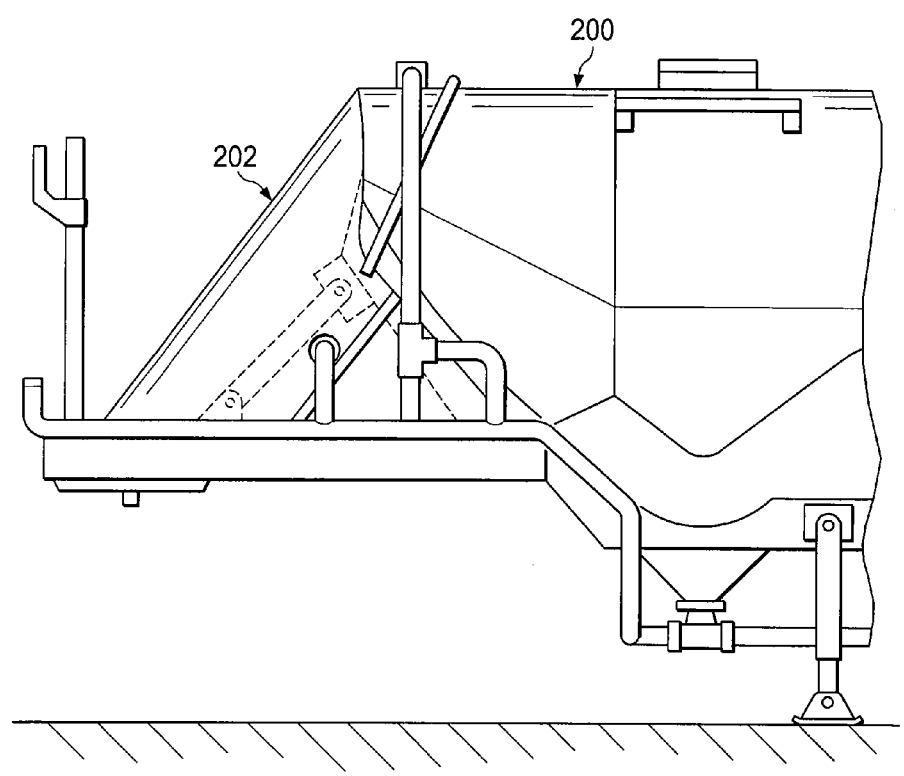
FIG. 3 is a schematic, side view of a gap fairing mounted on a pneumatic container trailer in accordance with an illustrative embodiment.
Figure 4:
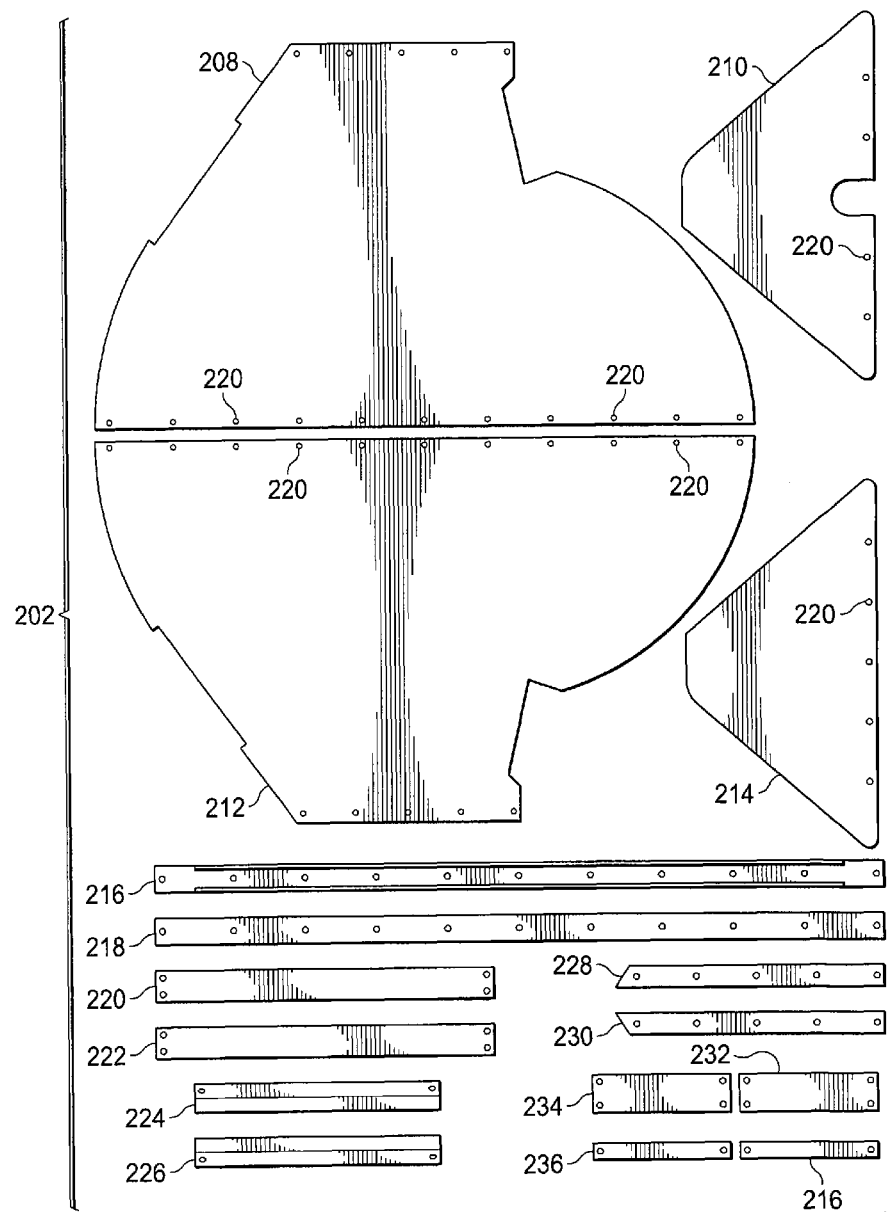
FIG. 4 is a schematic, top view of components of the gap fairing in accordance with an illustrative embodiment.
Figure 5:
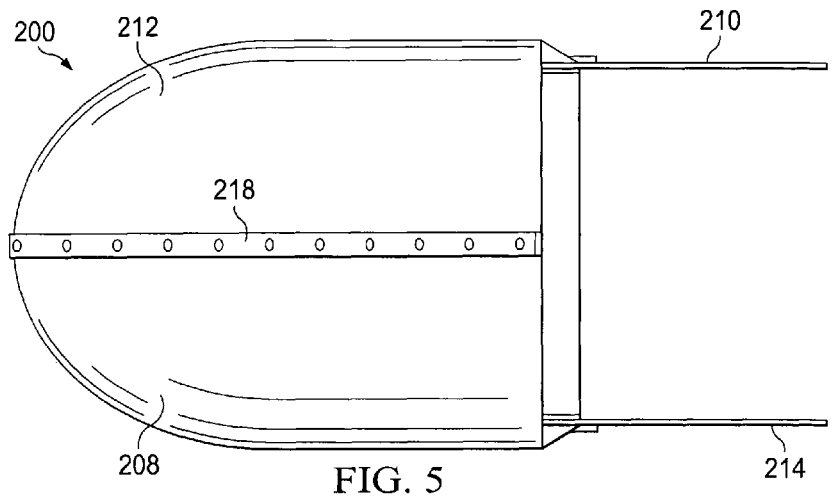
FIG. 5 is a schematic, top view of the gap fairing in accordance with an illustrative embodiment.
Figure 6:
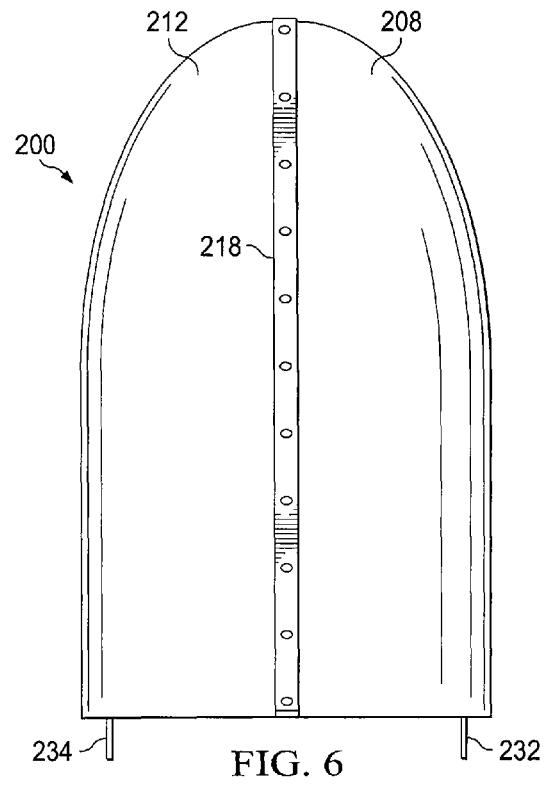
FIG. 6 is a schematic, front view of the gap fairing in accordance with an illustrative embodiment.
Figure 9:
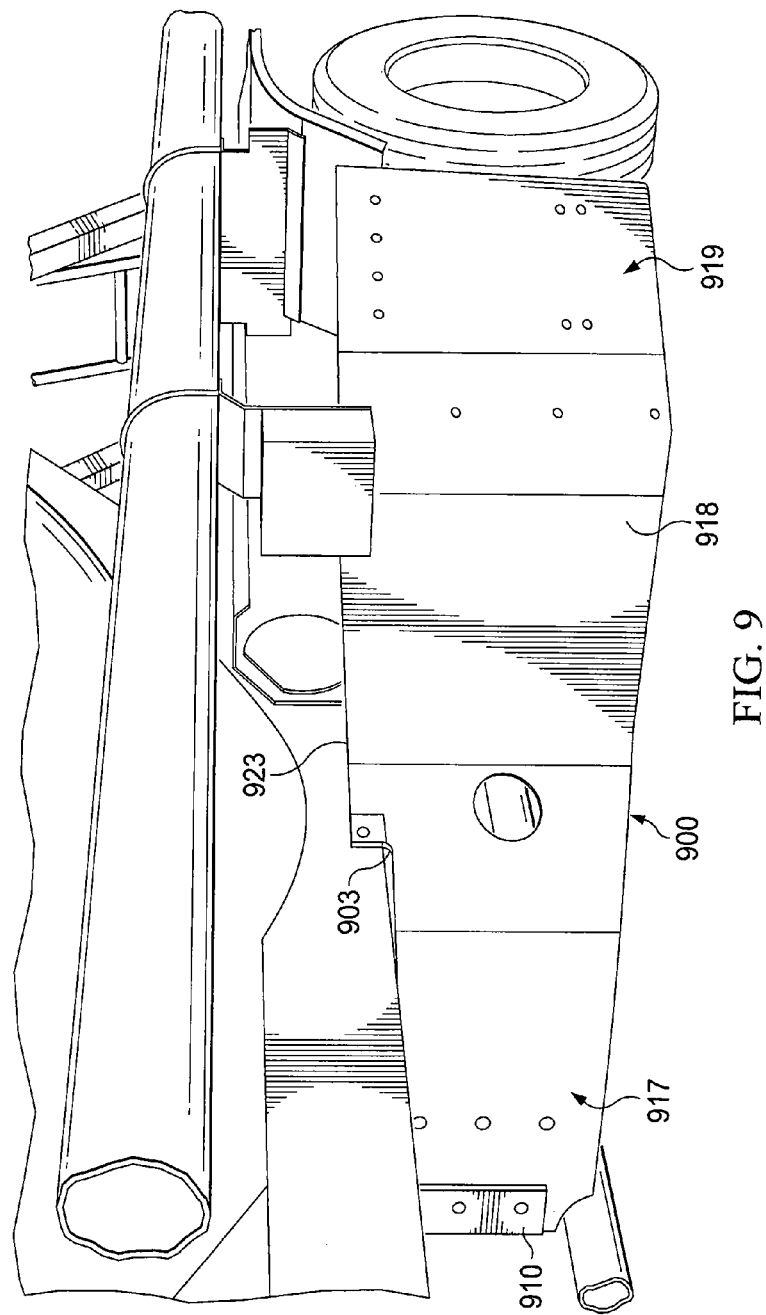
FIG. 9 is a schematic, pictorial representation of a pneumatic container trailer with an undercarriage fairing installed in accordance with an illustrative embodiment.
Figure 10:
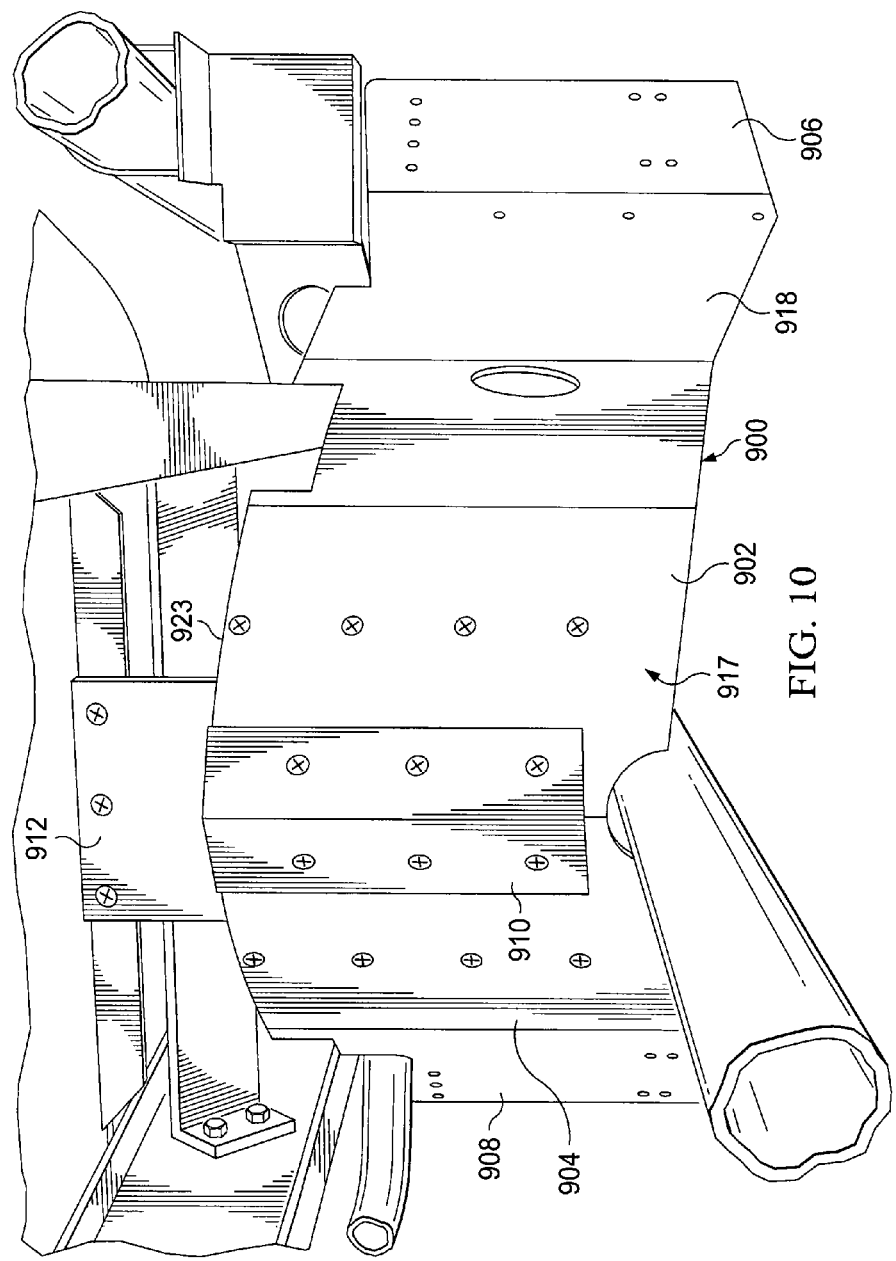
FIG. 10 is a schematic, frontal pictorial representation of a pneumatic container trailer with an undercarriage fairing installed in accordance with an illustrative embodiment.
Figure 11:
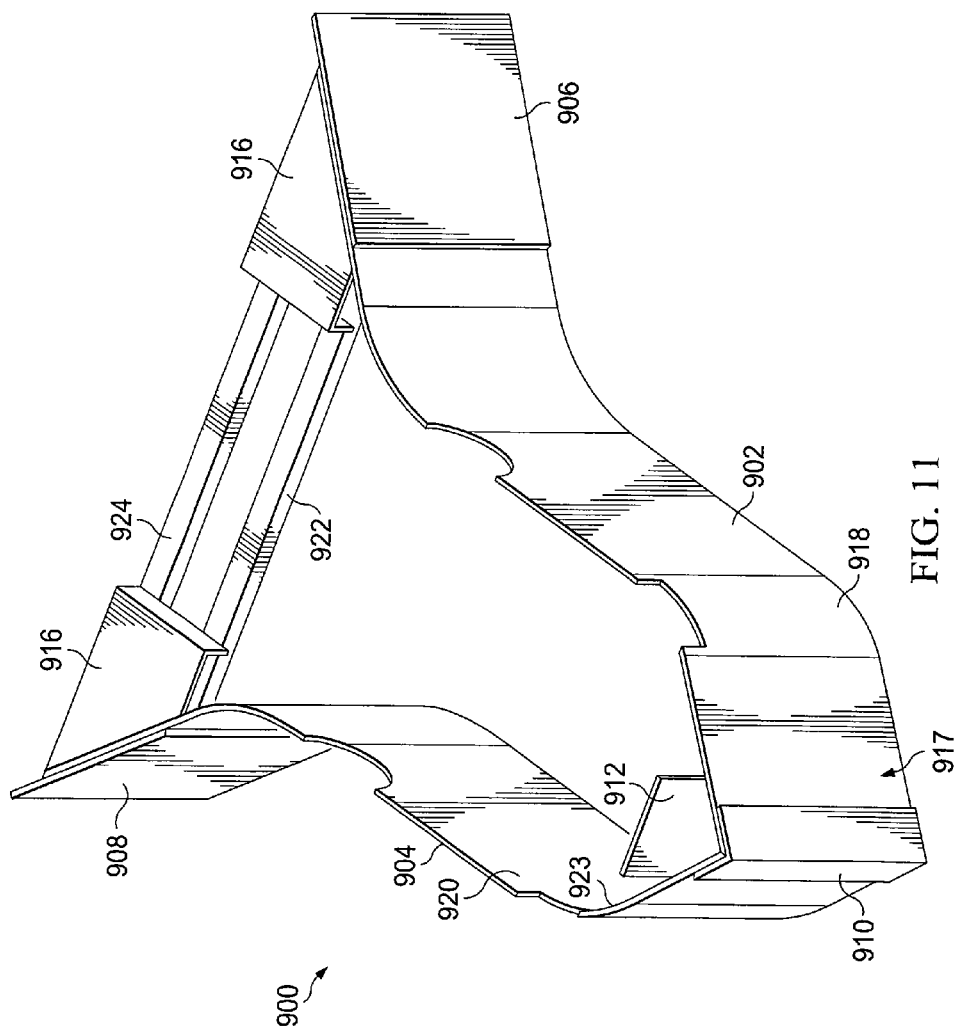
FIG. 11 is a schematic, pictorial representation of an undercarriage fairing in accordance with an illustrative embodiment.
Figure 12:
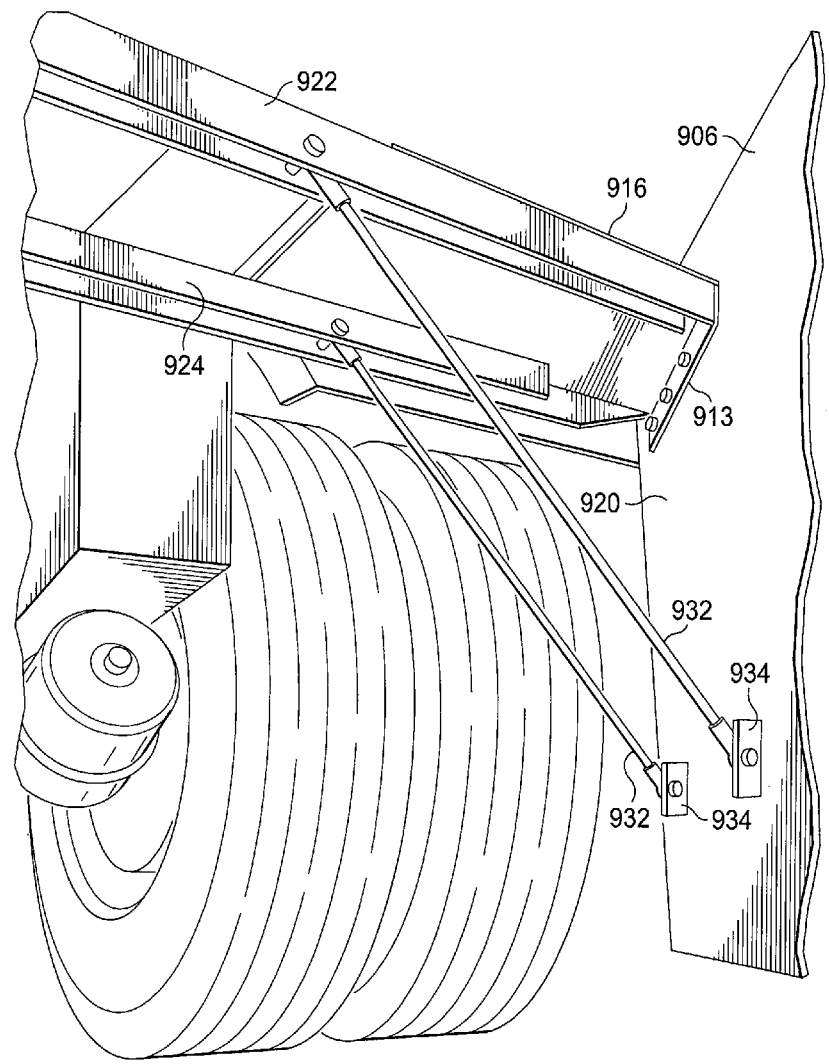
FIG. 12 is a schematic, pictorial representation of an inside view of supports of an undercarriage fairing in accordance with illustrative embodiment.
Figure 13:
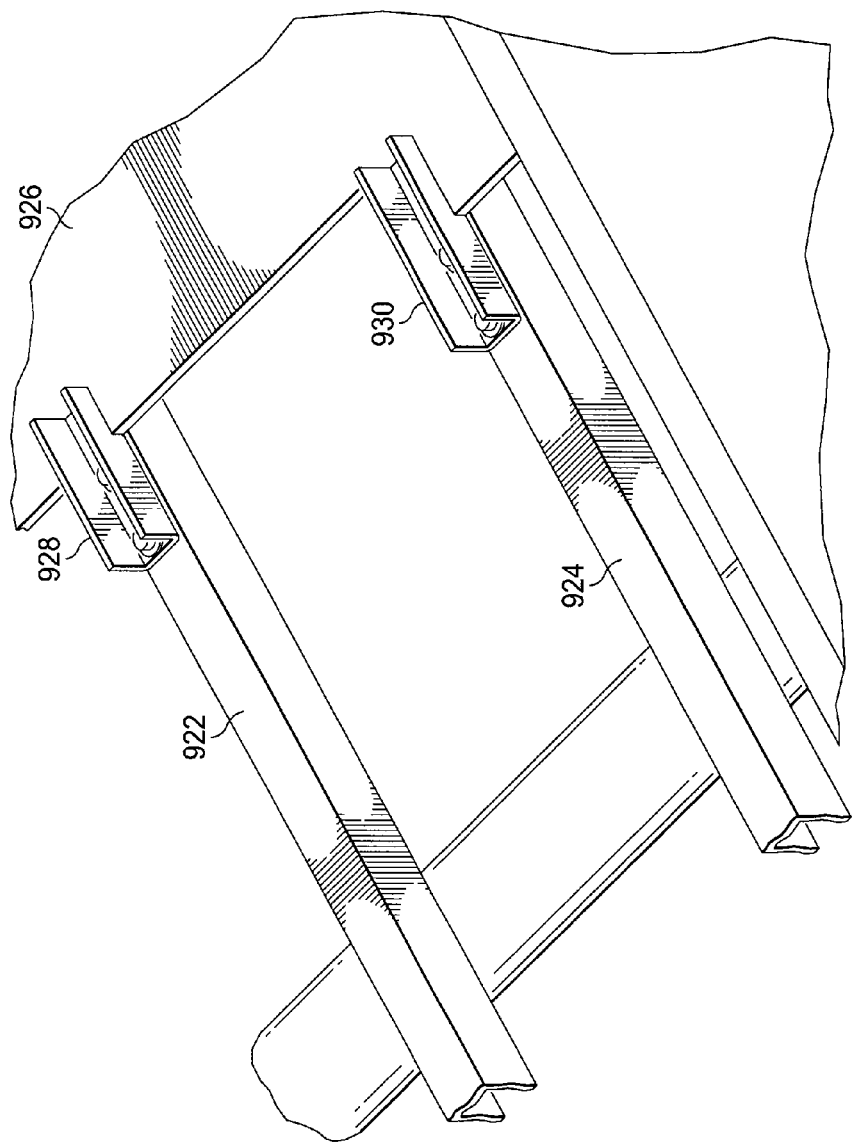
FIG. 13 is a schematic, pictorial representation of an inside view of supports of an undercarriage fairing in accordance with illustrative embodiment.
Figure 14:
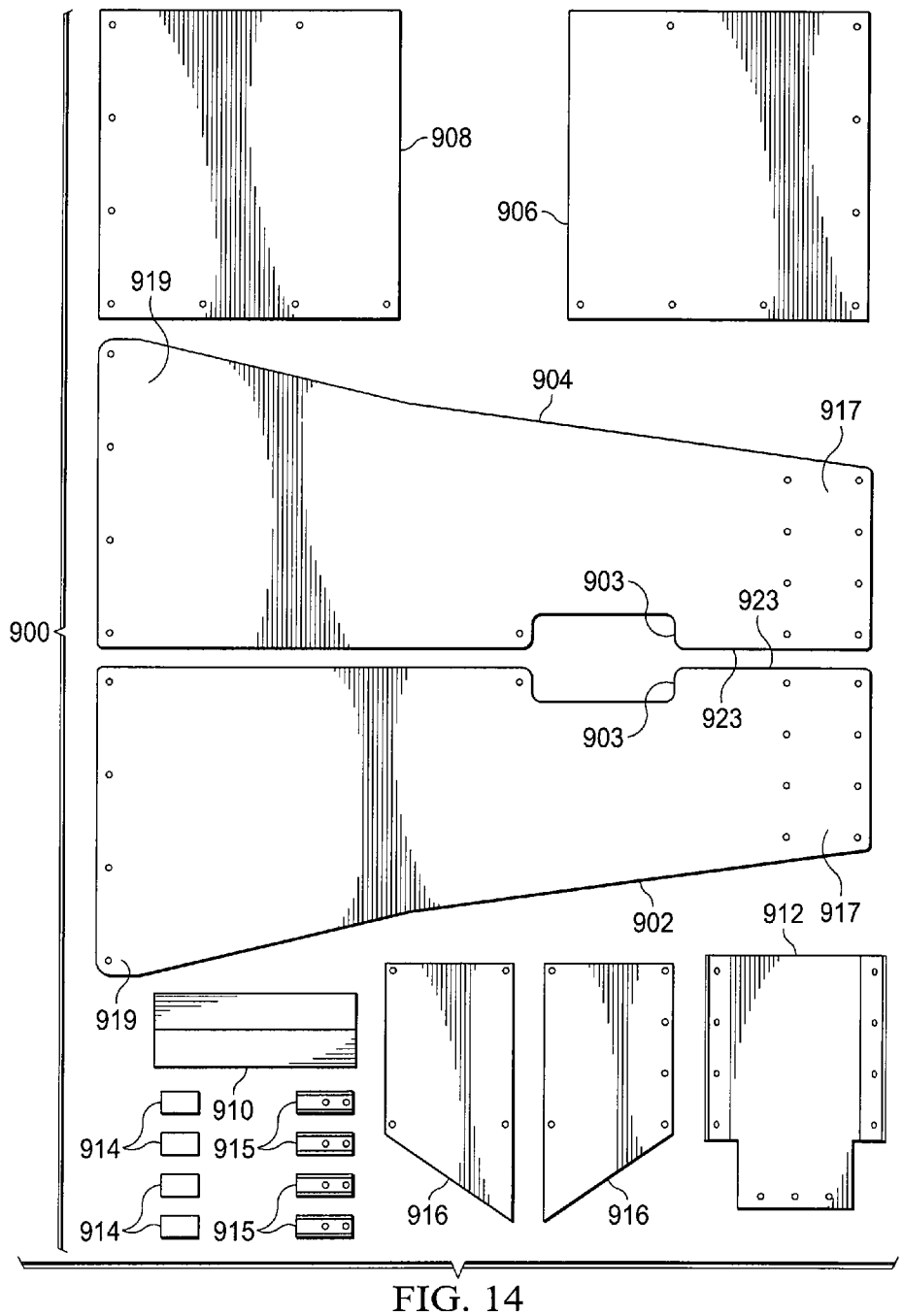
FIG. 14 is a schematic, top view of components of the undercarriage fairing in accordance with an illustrative embodiment.
Figure 15:
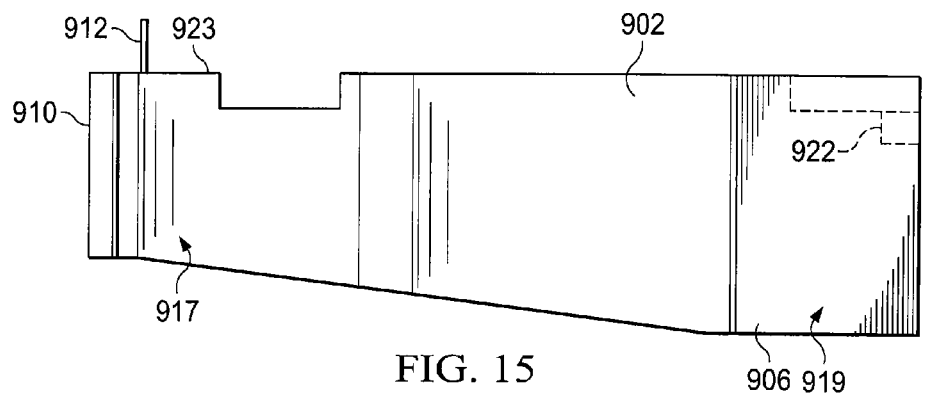
FIG. 15 is a schematic, side view of the undercarriage fairing in accordance with an illustrative embodiment.
Figure 16:
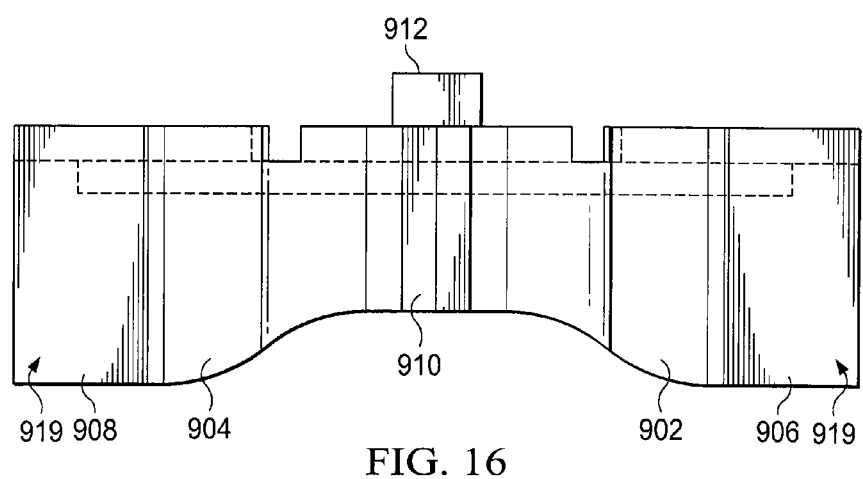
FIG. 16 is a schematic, front view of the undercarriage fairing in accordance with an illustrative embodiment.
Figure 17:
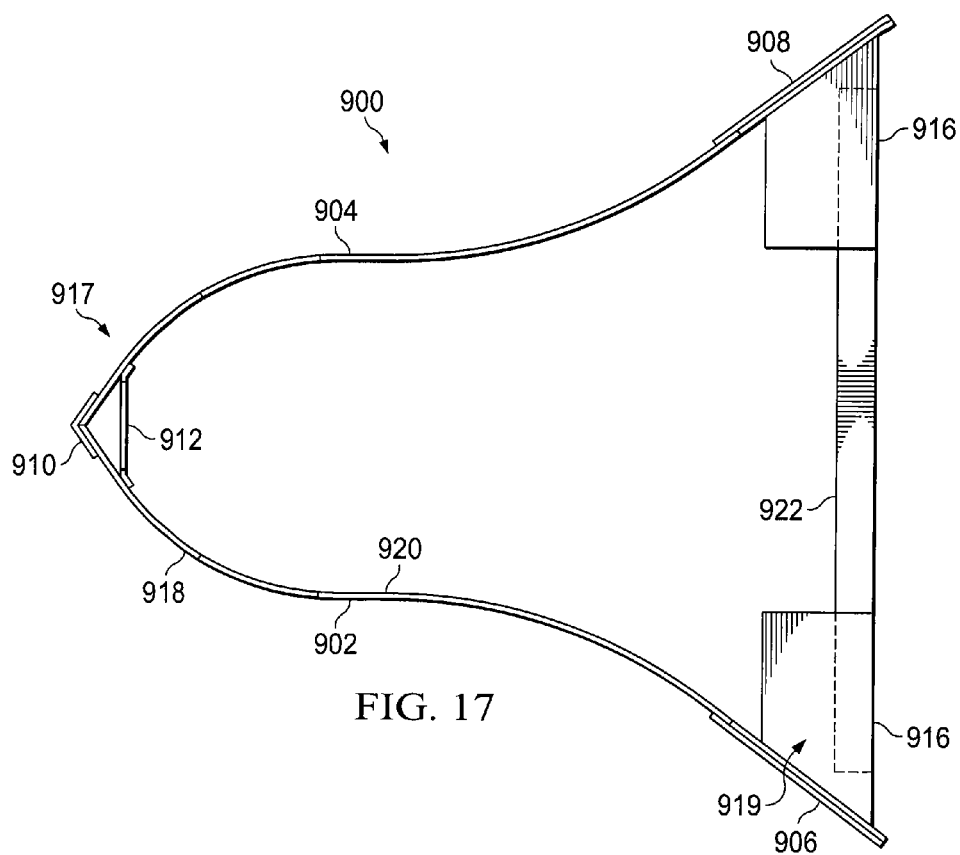
FIG. 17 is a schematic, bottom view of the undercarriage Faring in accordance with an illustrative embodiment.

FIG. 2 is a schematic, pictorial representation of a pneumatic container trailer 200 with a gap fairing 202 and an undercarriage fairing 900 (jointly the "fairings 201") installed in accordance with and illustrative embodiment. Each of the fairings 201 may be utilized to reduce drag of the pneumatic container trailer 200 between 3-5%. As a result, the fairings 201 provide an improved fuel economy to the vehicle pulling the pneumatic container trailer 200.

The fairings 201 provide a system and method of equipping the pneumatic container trailer 100 with fairings 201 that produce the benefits of fairings utilized on traditional box or rectangular shaped trailers. In one embodiment, the components that make up the fairings 201 are manufactured and shipped as flat or substantially flat components to significantly reduce the domestic or worldwide shipping costs.

The fairings 201 may be bent, cut, trimmed, modified, or otherwise positioned to fit any number of different trailer types that include, but are not limited to, pneumatic or liquid container trailers. For example, portions of the fairings 201 may be cut to slip over hoses, tubes, gauges, extensions or so forth. The cut portions may then be connected back together utilizing metal connectors, brackets, or so forth on one or more internal and external sides of the fairings. As a result, the fairings 201 are extremely adaptable while still providing enhanced fuel economy. The slope of the gap fairing 202 may also vary based on the height of the pneumatic container trailer 200 components (e.g. storage container) and the length of the front end of the pneumatic container trailer 200. The gap fairing 202 (and corresponding angle) may be positioned between a top of a front head of the front end 206 and bottom end. The gap fairing may be adapted to fit any strut frame trailer design.

In one embodiment, the gap fairing 202 is adapted to be attached to a front end 206 of the pneumatic container trailer 200. The gap fairing 202 may have a substantially half conical shape (e.g. right circular cone or an oblique circular cone. For example, the gap fairing 202 may have a partial conical shape (e.g. envision a cone divided in half vertically from the vertex in a straight line or at various angles to accommodate the trailer shape). For example, a bottom portion of the circle of the cone may have extensions that extend laterally to wrap further around the front portion of the pneumatic container trailer 200. The bottom edge of the gap fairing 202 may be positioned against the pneumatic container trailer 200. For example, the bottom edge of the gap fairing 202 (i.e. front or edges that wrap around) may be secured to front or side gussets, braces, beams, frame, or other support structure of the pneumatic container trailer 200. The support structure of the pneumatic container trailer 200 includes the frame, beams, and other structural components of the pneumatic container trailer 200. The internal structure of the gap fairing 202 may keep the panels and other portions of the gap fairing 202 in tension to maintain the desired positioning and angles.

Turning now to FIGS. 3-8 illustrating a gap fairing 202 in accordance with an illustrative embodiment. The gap fairing 202 may be shipped alone or with the described undercarriage fairing as a kit based on the needs of a user and specifications of a trailer. In one embodiment, the gap fairing 202 may be made up of panels 208, 210, 212, and 214 (jointly the "panels 215"), such as four flexible plastic parts, and connectors 216-226 (jointly the "connectors 227"), such as ten or more metal connectors (including L-shaped brackets, U-channels, and flat panels).

The panels 215 may also be referred to as cowls because of their respective positions and shapes. The panels 208 and 210 may also referred to as front panels and the panels 212 and 214 may be referred to as rear panels based on their relative positioning (this applies to the other embodiments as well). In another embodiment, the panels 208 and 212 may represent a single panel and panels 210 and 214 may represent a single panel.

In one embodiment, the panels 215 are connected together in a substantially half cone or hemiconical shape. As a result, the gap fairing 202 has a half-conical shape that decreases drag on the other components of the pneumatic container trailer 200. The panels 215 may be bent around or against the support structure (e.g. hose holder, front frame, front head, container, hopper, etc.) of the pneumatic container trailer 200 to provide a custom fit.

In one embodiment, the panels 208 and 212 may be approximately 80" long and approximately 48" wide. The panels 210 and 214 may be approximately 42" wide and 23.25" wide. The panels described herein may be formed of ThermoPlastic Olefin (TPO), Acrylontrile Butadiene Styrene (ABS) plastic, flexible polyurethane, thermo-plastic, polycarbonate, polypropylene, rigid polymer alloys, nylon alloys, fiberglass, reinforced polyester, aluminum alloy, or other similar types of plastic, metal, or composites that are strong and lightweight.

The components of the gap fairing are more efficiently shipped and positioned if they are shipped flat and then subsequently bent into position during installation. In one embodiment, the panels 215 may be 0.2" thick. The connectors described herein may be formed aluminum, steel, polymers, or a metal composite and may be approximately 0.125" thick. However, the thickness of the different components may vary based on application between approximately $\frac{1}{8}$"-$\frac{1}{4}$" or larger in some circumstances (e.g. increased winds or object strikes are expected).

The components of the gap fairing 202 may be produced or manufactured with holes 220 for bolts, washer, and nuts to attach the various components to each other or to a front frame portion of a pneumatic container trailer 200. For example, a bottom portion of the panels 215 adjacent the frame of the pneumatic container trailer may be attached in the front and/or sides of the frame. For example, matching holes may be drilled or pre-drilled through the frame, beams, or support structure to secure the panels 215 in place utilizing bolts and aluminum fastener plates on one or more sides of the panels 215.

In one embodiment, the panels 215 may be connected utilizing shoulder bolts. The shoulder bolts may have a shaft with a thickness greater than a threaded portion where a nut is screwed on. The shoulder bolts may be utilized to ensure that the panels 215 are not overly tightened onto the frame of the pneumatic container trailer 200 resulting in potential failure of the panels 215 or other connectors, such as metallic sheets.

The shoulder bolts or other similar fasteners may provide a loose yet secure connection. In one embodiment, the holes 220 may be slotted to accommodate the thermal expansion of the panels 215. In one embodiment, panels 208 and 212 may be joined together in the front or exterior surface by connector 218 and in the rear or against the interior surface by the connector 216.

In one embodiment, the connected panels 208 and 212 are connected to gussets of the pneumatic container trailer 200 utilizing any number of bolts. The panels 208 and 212 may include an angled bracket (not shown) for connecting the panels 208 and 212 to the gussets utilizing bolts.

The panels 210 and 214 are attached to the panels 208 and 212, respectively. In one embodiment, each of the panels 208-214 are interconnected utilizing connectors 228 and 230, represented as metal strips. In other embodiments, the panels 208-214 may be connected utilizing rivets, plastic welding, industrial adhesives, or so forth.

The internal structure of the gap fairing 202 may include one or more horizontal or diagonal supports. The supports make extend through the struts and other structural components of the pneumatic container trailer 200 to stabilize and secure the panels 215 to form the gap fairing 202. In one embodiment, the back side of the gap fairing 202 is connected to a reinforcing box 228. The reinforcing box 228 may be formed utilizing connectors 220 and 222, shown as metal strips, and connectors 224 and 226, shown as metal angles. The reinforcing box 228 may be attached to panels 210 and 214 and/or through or to a front frame portion of the pneumatic container trailer 200. The reinforcing box 228 or associated components provide a tension bearing support to support the panels 215 that are bent into shape. In another embodiment, the reinforcing box 228 is replaced may cables, rods, or other tensioned connectors that extend between the panels 215 to maintain the desired shape and cohesion of the gap fairing in the event of unforeseen circumstances, such as a wreck, bad weather, strikes, or so forth.

The gap fairing 202 may be connected to the front frame portion utilizing connectors 232 and 234 and any number of other similar connectors. The gap fairing 202 may be further stabilized utilizing diagonal supports, such as brackets, connecting rods, or other components. The gap fairing 202 including the panels 215 may be secured by the internal supports including the reinforcing box 228 through the struts, beams and other components that make up the pneumatic container trailer 200 itself.

In one embodiment, the gap fairing 202 may only weight 66 pounds, but may improve fuel economy by as much as four tenths of a mile per gallon. The gap fairing 202 may be positioned at the front of the pneumatic container trailer 200 against, over, adjacent, or extending from the structural components of the front of the pneumatic container trailer 200, such as a hose holder mast ("flag pole"), front frame, and front head.

Turning now to FIGS. 9-17, illustrating an undercarriage fairing 900 in accordance with an illustrative embodiment. As previously described, the components of the undercarriage fairing 900 may be shipped as a kit to be assembled. The undercarriage fairing 900 may include at least panels 902, 904, 906, and 908, front connector 910, front bridge 912, connectors 914, connectors 915, and joints 916. The components of the undercarriage fairing 900 may be pre-drilled or provided with holes for bolting the components to each other and to the undercarriage of the frame of the trailer. When the components are assembled, the undercarriage fairing 900 forms a bell-like shape (see FIGS. 11 and 17) that increases the aerodynamics of the trailer by reducing drag on the undercarriage, frame, rear wheel assembly, and other portions of the trailer.

In one embodiment, the panels 902 and 904 may be approximately 81" long and approximately 19" high at a front end 917 and widened to approximately 28" high at a rear end 919. The panels 902 and 904 may include one or more cut-outs including cut-out 903. In one embodiment, the panels 902 and 904 may narrow or taper from the rear end 919 to the front end 917 to accommodate components, such as a discharge pipe of a pneumatic container trailer. In other embodiments, the panels 902 and 904 may have a uniform width.

The cut-out 903 may be configured to accommodate the frame 926 of the trailer. For example, the cut-outs 903 may fit against one or more beams of the frame 926. The panels 902 and 904 may also have a cut-out corner near the front end 917 configured to fit over or against the discharge pipe. The panels 902-908 may have any number of cut-outs, knock outs, or holes providing access to different trailer components or allowing trailer components to extend through the undercarriage fairing 900. In one embodiment, approximately 6-10" of clearance is left between the bottom of panels 902-908 and the roadway. However, the clearance may vary based on the driving environment associated with the trailer.

In one embodiment, the panels 906 and 908 are positioned at the sides/edges of the trailer just in front of the rear wheels and rear wheel assembly. For example, the plane of the panels 906 and 908 may be inwardly angled toward the center of the trailer. The panels 902 and 904 come together from the rear end 919 underneath the middle of the trailer to be connected in a front end 917. As a result, the undercarriage fairing 900 may form a wedge, V, or bell shape for cutting through the air to reduce the air drag (see FIGS. 11 and 17). In another embodiment, the panels 902 and 906 may represent a single panel and panels 904 and 908 may represent a single panel.

Panels 902 and 904 may be attached or joined together at the front end 917 of the undercarriage fairing 900 by the front connector 910 (shown as a V-shaped bracket) and the front bridge 912. For example, the front connector 910 may be connected to an exterior surface 918 of the undercarriage fairing 900 and the front bridge 912 may be connected to an interior surface 920 of the undercarriage fairing 900.

In one embodiment, the front bridge 912 may be connected to the panels 902 and 904 utilizing any number of bolts, washers, and nuts. The front bridge 912 may be wider than the front connector 910 to provide additional stability where connected to the panels 902 and 904. As shown in FIG. 1, the front bridge 912 may extend above a top edge 923 of the undercarriage fairing 900. In one embodiment, the front bridge 912 may be connected directly to the undercarriage or frame of the trailer. In another embodiment, the front bridge 912 may connect to a U-channel that is also attached to the frame 926 as is subsequently described (e.g. U-channels 922 and 924 connected between elements of the frame).

The front connector 910 may be a metal angled piece with an angle configured to bring the panels 902 and 904 together. The front connector 910 includes holes that align with holes of the panels 902 and 904 for bolting the components together. In one embodiment, the front bridge 912 is a connector with two side flanges for securing to the panels 902 and 904 and a vertically extending portion for connecting to the frame 926 (e.g. cross beam, support structure) or a U-shaped channel that is clamped horizontally to the frame (as is subsequently described). The front bridge 912 may be connected to the undercarriage of the frame of the trailer, such as the frame rails, a hopper lip, or so forth. For example, the front bridge 912 may extend above a top edge of the panels 902 and 904 to connect to the frame 926. The panels 906 and 908 are each connected to one of the panels 902 and 904. For example, the panels 906 and 908 may be directly connected to the interior surface 920 of the panels 902 and 904 utilizing carriage bolts.

In one embodiment, the weight of the rear portion 919 of the panels may be supported by U-channels 922 and 924 that are connected to the frame of the trailer. The joints 916 may be connected to or between the channels 922 and 924 and to the panels 902 and 904. The joints 916 may be shipped pre-bent or may be bent or formed when received to fit the trailer. For example, the joints 916 may be bent to form a lip 913 that is then connected to the panels 902 and 904.

The U-channels 922 and 924 may be clamped to a frame 926 of the trailer (see FIG. 13) to securely affix and hold the U-channels 922 and 924 and the undercarriage fairing 900. For example, clamping brackets 928 and 930 may be attached to the frame 926 (shown as a beam). The clamping brackets 928 and 930 may be connected utilizing carriage bolts and nuts, screws, or other attachment components or mechanisms known in the art. In one embodiment, the clamping brackets 928 and 930 may be loosely fitted against the U-channels 922 and 924 while assembling the undercarriage fairing 900 to allow for a custom fit of the frame 926 of the trailer.

In one embodiment, the panels 902 and 904 may be further supported by connecting rods 932 and 934. For example, the connecting rods 932 may be connected to brackets 934 that are secured to the panels 902 and 904 at one end and to the U-channels 922 and 924 at a second end. In one embodiment, the connecting rods 932 may be pivotally connected at a first end to a bottom portion at or near the edge of the panels 902 and 904 and at a second end to the U-channel 922 and 924.

As a result, the panels 902 and 904 and connecting rods 932 may bend slightly, move, or reposition in response to striking objects, such as tires, rocks, or other roadway hazards. The connecting rods 932 provide diagonal supports that support the panels 902 and 904. The ability to flex or move slightly may prevent the undercarriage fairing 900 from breaking in response to heavy winds, striking objects, or other unforeseen circumstances. In one embodiment, the connecting rods 932 are fiberglass rods that are configured to receive substantial strikes or impacts against the panels 902-908 without breaking. As a result, the panels 902-908 may flex in response to a strike before returning to the default installed position.

In one embodiment, the rear portion 919 of the panels 902 and 904 may be positioned directly in front of the wheel assembly to reduce drag on the wheels, undercarriage and so forth. In one embodiment, the undercarriage fairing 900 adds only about 63 pounds to the weight of the trailer while increasing the fuel economy by as much as three tenths of a mile per gallon.

Figure 18:
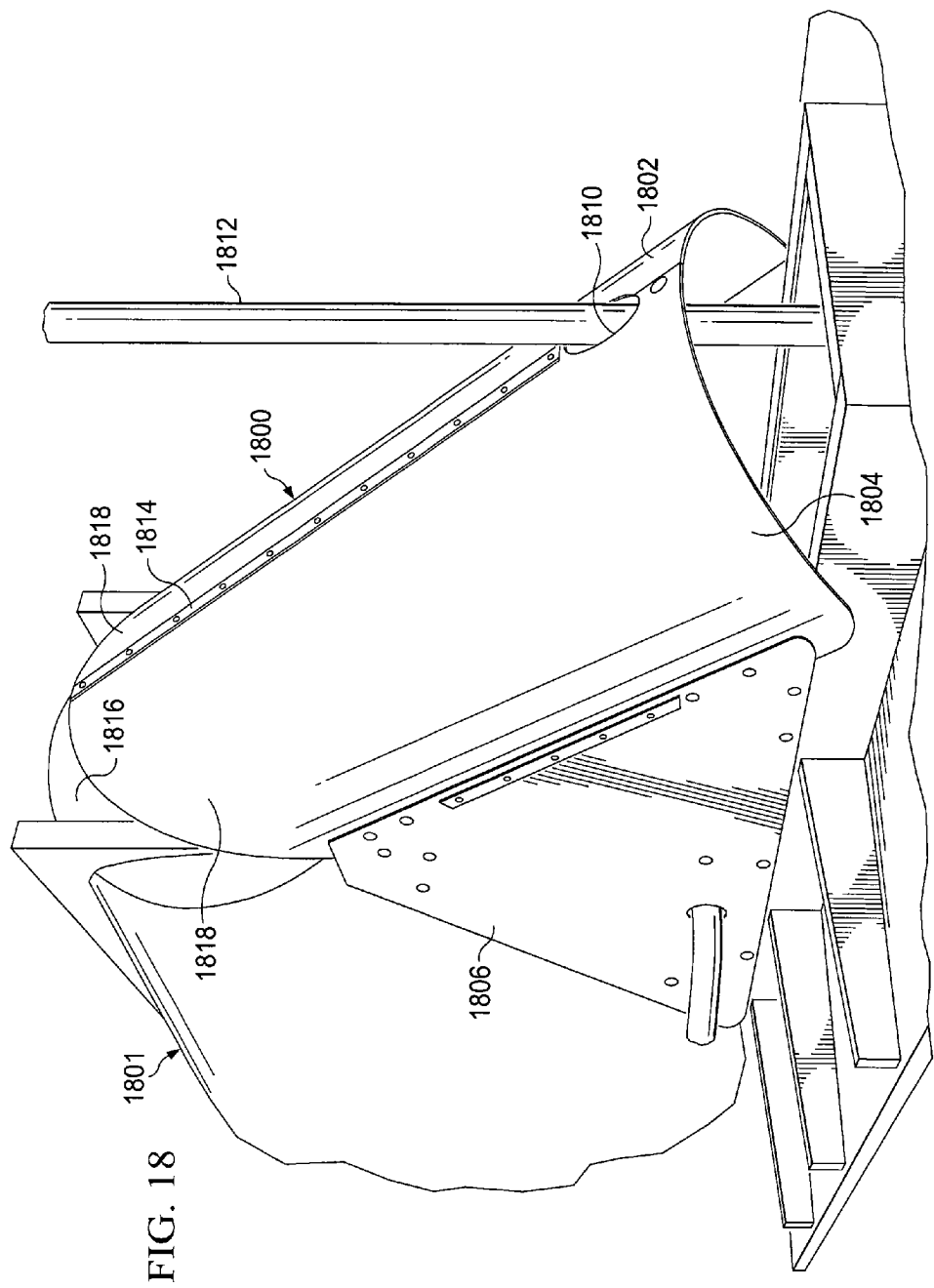
FIG. 18 is a schematic, pictorial representation of another gap fairing in accordance with an illustrative embodiment.

FIG. 18 is a schematic, pictorial representation of another gap fairing 1800 installed on a trailer 1801 in accordance with an illustrative embodiment. The gap fairing 1800 illustrates panels 1802, 1804, 1806, and 1808 (not visible) of different sizes and configurations. In one embodiment, the panels 1802 and 1804 may extend to be flush with the support structure (see FIG. 5). The gap fairing 1800 may not extend all the way. In another embodiment, the gap fairing 1800 includes another panel (not shown) to further extend the length of the front fairing main section created by the panels 1802 and 1804. In yet another embodiment, an additional upper panel or side panels (not shown) may be connected to further reduce drag.

The gap fairing 1800 may include a cut-out 1810 for the hose holder 1812. In one embodiment, the cutout 1810 may be generated or fabricated during the manufacturing process. In another embodiment, the cut-out 1810 may be created by a person installing the gap fairing 1800.

The panels 1802 and 1804 when connected by at least connector 1814 provide a substantially rectangular shape with a rounded top portion 1818. In one embodiment, a top portion of the panels 1802 and 1804 may nearly reach a top portion 1816 of the trailer 1801 to provide effective drag reduction.

The panels 1806 and 1808 are substantially triangular shaped and increased in size over other embodiments. In one embodiment, the panels 1806 and 1808 may be connected to side gussets (not shown) that are part of the support structure of the trailer 1801. The panels 1802-1808 may be configured to be connected utilizing the connectors as are herein described with or without overlapping sections of the panels 1802-1808.

The fairings may be installed by positioning the panels, bending the panels into shape around the support structure of the trailer, interconnecting the panels to one another, and connecting the panels to the support structure of the trailer, and further securing the panels utilizing one or more connectors. The support structure of the trailer may be modified, drilled, or otherwise adapted to receive the fairings. The aerodynamic configuration of the fairings may take any number of shapes that are customized for the particular trailer.

In one embodiment, the plastic panels (including holes, slots, and cut-outs), connectors, brackets, or support components of the described embodiments may be automatically cut and drilled using an automatic cutting program and tool. The panels are fabricated, cut, and shipped flat for ease of manufacturing and shipping. The panels are then bent into position to create an aerodynamic shape for the respective gap fairings and undercarriage fairings.

In one embodiment, the fairings may be installed without cutting or drilling holes in the trailer or associated frame. In another embodiment, the fairings may be installed with minimal holes or structural modifications to the trailer. For example, the fairings may clamp onto existing beams, brackets, or structures of the trailer. In one embodiment, the fairings may have a floating attachment for all or a portion of the components of the fairings such that the attachment points of the fairings may float slightly in response to thermal expansion, wind, object strikes, or so forth to prevent undue damage.

The drag coefficient of the trailer may be reduced by installing the fairings because of the smooth surfaces provided by the plastic panels as well as the aerodynamic shapes of the gap fairing and the undercarriage fairing as are herein described and shown. The fairings substantially improve the aerodynamic properties of the trailers resulting in significant improvements in fuel economy.

Although this description contains many specifics, these should not be construed as limiting the scope of the invention but as merely providing illustrations of the presently preferred embodiment thereof, as well as the best mode contemplated by the inventor of carrying out the invention. The invention, as described herein, is susceptible to various modifications and adaptations, as would be understood by those having ordinary skill in the art to which the invention relates. The previous detailed description is of a small number of embodiments for implementing the invention and is not intended to be limiting in scope. The following claims set forth a number of the embodiments of the invention disclosed with greater particularity.

What is claimed:

1. A gap fairing comprising:
one or more panels interconnected utilizing connectors to form an aerodynamic extension from a front portion of a trailer, wherein the one or more panels form a partial conical shape; and
supports connected between the one or more panels through a support structure of the trailer;
wherein the partial conical shape comprises a partial conical frustum.

2. The gap fairing according to claim 1, wherein at least one panel of the one or more panels is bent around the support structure of the trailer.

3. The gap fairing according to claim 1, wherein at least one panel of the one or more panels is substantially rectangular in shape.

4. The gap fairing according to claim 1, wherein at least one panel of the one or more panels includes a cut-out.

5. The gap fairing according to claim 1, wherein a bottom portion of the one or more panels is connected to the support structure of the trailer.

6. The gap fairing according to claim 1, wherein components of the gap fairing including the one or more panels and the supports are shippable as a flat package.

7. The gap fairing according to claim 1, wherein the one or more panels include at least four plastic panels.

8. The gap fairing according to claim 1, wherein a bottom edge of the one or more panels is positioned against the support structure of the trailer.

9. The gap hiring according to claim 1, wherein the supports are connected to the one or more panels by connectors utilizing carriage bolts with a defined separation to support thermal expansion of the one or more panels.

10. The gap fairing according to claim 1, wherein the connectors include metal strips for connecting the one or more panels.

11. The gap fairing according to claim 1, wherein the one or more panels includes at least two front panels that are interconnected, and at least two rear panels that are connected to each of the at least two front panels.

12. The gap fairing according to claim 1, wherein the supports form a reinforcing box that extend through the support structure of the trailer.

13. A pneumatic container trailer with a gap fairing, comprising:
the pneumatic container trailer including a support structure;
one or more panels interconnected to form a partial conical shape, wherein the one or more panels are interconnected utilizing connectors; and
supports connected between the one or more panels through the support structure of the trailer;
wherein at least one panel of the one or more panels is substantially rectangular in shape.

14. The trailer according to claim 13, wherein at least one panel of the one or more panels is bent around the support structure of the trailer.

15. The trailer according to claim 13, wherein the partial conical shape comprises a partial conical frustum.

16. A gap fairing comprising:
one or more panels, wherein the one or more panels are interconnected utilizing connectors to extend over a support structure of a pneumatic container trailer, wherein the one or more panels form a partial conical shape; and
supports connected to the one or more panels extend through the support structure of the trailer to secure the one or more panels;
wherein at least one panel of the one or more panels is bent around the support structure of the trailer.

17. The gap fairing according to claim 16, wherein the partial conical shape comprises a partial conical frustum.

* * * * *